US006982045B2

(12) United States Patent
Menkara et al.

(10) Patent No.: US 6,982,045 B2
(45) Date of Patent: Jan. 3, 2006

(54) LIGHT EMITTING DEVICE HAVING SILICATE FLUORESCENT PHOSPHOR

(75) Inventors: Hisham Menkara, Mableton, GA (US); Christopher Summers, Atlanta, GA (US)

(73) Assignee: Phosphortech Corporation, Lirhia Springs, GA (US)

( * ) Notice: Subject to any disclaimer, the term of this patent is extended or adjusted under 35 U.S.C. 154(b) by 171 days.

(21) Appl. No.: 10/628,115

(22) Filed: Jul. 28, 2003

(65) Prior Publication Data

US 2004/0227465 A1 Nov. 18, 2004

Related U.S. Application Data

(60) Provisional application No. 60/471,619, filed on May 17, 2003.

(51) Int. Cl.
*C09K 11/59* (2006.01)
(52) U.S. Cl. .............................. 252/301.4 F; 313/486; 313/503; 257/98; 257/E33.061
(58) Field of Classification Search ......... 252/301.4 F; 252/ 313/486, 503; 257/98, E33.061
See application file for complete search history.

(56) References Cited

U.S. PATENT DOCUMENTS 4,512,911 A  4/1985 Kotera et al. ........ 252/301.4 H
4,661,419 A  4/1987 Nakamura ................. 428/691

(Continued)

OTHER PUBLICATIONS

Derwent Abstract for KR 2003060697, Jul. 16, 2003.*

(Continued)

*Primary Examiner*—C. Melissa Koslow
(74) *Attorney, Agent, or Firm*—Chris Whewell

(57) ABSTRACT

Provided herein are novel phosphors useful in the manufacture of white light emitting diodes. The phosphors provided by the invention are described by the formula:

$$Sr_xBa_yCa_zSiO_4:Eu$$

in which x, y, and z are each independently variable to be any value between about 0 and about 2, including without limitation 0.001 and 2, and every thousandth therebetween, subject to the proviso that the sum of x, y, or z is equal to at least 1, and in which Eu is present in any amount between about 0.0001% and about 5% by weight based upon the phosphor's total weight, wherein substantially all of the europium present is present in the divalent state. A phosphor according to the invention may optionally further comprise an element selected from the group consisting of: Ce, Mn, Ti, Pb, and Sn and is present in any amount between about 0.0001% and about 5% by weight based on the phosphor's total weight. The silicate phosphor materials provided by the present invention do not require the addition of dissimilar blue and red phosphor compounds, and do not contain zinc and/or magnesium. In addition, the present invention provides materials which emit a broad yellowish color containing both green and red emissions.

Standard techniques used in phosphor deposition for the manufacture of light emitting diodes which comprise phosphors may be employed to produce LED's having a white light output when the phosphors of the invention are utilized.

13 Claims, 5 Drawing Sheets

U.S. PATENT DOCUMENTS

| | | | |
|---|---|---|---|
| 5,140,604 A | 8/1992 | Alablanche et al. | 372/41 |
| 5,198,679 A | 3/1993 | Katoh et al. | 250/484.4 |
| 5,422,538 A * | 6/1995 | Ouwerkerk et al. | 313/486 |
| 5,602,445 A | 2/1997 | Solanki et al. | 313/503 |
| 5,608,554 A * | 3/1997 | Do et al. | 349/70 |
| 5,648,181 A | 7/1997 | Watanabe | 428/689 |
| 5,698,857 A | 12/1997 | Lambert et al. | 250/483.1 |
| 5,998,925 A | 12/1999 | Shimizu et al. | 313/503 |
| 6,006,582 A | 12/1999 | Bhandari et al. | 73/23.2 |
| 6,066,861 A | 5/2000 | Hohn et al. | 257/99 |
| 6,153,971 A | 11/2000 | Shimizu et al. | 313/486 |
| 6,255,670 B1 | 7/2001 | Srivastava et al. | 257/89 |
| 6,278,135 B1 * | 8/2001 | Srivastava et al. | 257/98 |
| 6,429,583 B1 * | 8/2002 | Levinson et al. | 313/503 |
| 6,555,958 B1 * | 4/2003 | Srivastava et al. | 313/506 |
| 6,621,211 B1 * | 9/2003 | Srivastava et al. | 313/503 |
| 6,656,608 B1 * | 12/2003 | Kita et al. | 428/690 |

OTHER PUBLICATIONS

Derwent Abstract 2004-006160 for KR2003060697 published Jul. 16, 2003.

* cited by examiner

LIGHT EMITTING DEVICE HAVING SILICATE FLUORESCENT PHOSPHOR

CROSS-REFERENCE TO RELATED APPLICATIONS

This application claims the benefit of U.S. Provisional Application Ser. No. 60/471,619, filed May 17, 2003, which application is incorporated herein by reference in its entirety.

STATEMENT AS TO FEDERALLY-SPONSORED RESEARCH

This invention was made, at least in part, with a government grant from the National Science Foundation (Grant No. 6108576). The U.S. government may have certain rights in this invention.

TECHNICAL FIELD

The present invention relates generally to solid-state light-emitting devices. More particularly, it relates to light emitting diodes and the like which comprise improved solid state materials having enhanced performance and efficiency over similar devices of the prior art.

BACKGROUND INFORMATION

There have been few major improvements in conventional lighting (i.e. incandescent, halogen, and fluorescent lamps) over the past 20 years. However, in the case of light emitting diodes ("LEDs"), operating efficiencies have been improved to the point where they are replacing incandescent and halogen lamps in traditional mono-chrome lighting applications, such as traffic lights and automotive taillights. This is due in part to the fact that LEDs have many advantages over conventional light sources that include long life, ruggedness, low power consumption, and small size. LEDs are monochromatic light sources, and are currently available in various colors from UV-blue to green, yellow, and red. Furthermore, due to LEDs' narrow-band emission characteristics, a white color LED can only be produced by: 1) arranging individual red, green, and blue (R, G, B) LEDs closely together and then diffusing and mixing the light emitted by them; or 2) combining a short-wave UV or blue LED with broadband fluorescent compounds that convert part or all of the LED light into longer wavelengths.

When creating a white LED using the first approach described above, several problems arise due to the fact that the R, G, B light emitting devices are made of different semiconductor materials, which require different operating voltages and, therefore, complex driving circuitry. Other disadvantages include low color-rendering characteristic of the resulting white light due to the monochromatic nature of the R, G, B LED emissions, and the different emission temperature dependences of the different semiconductor materials.

The second approach for producing white light from LEDs is in general more preferred, since it only requires a single type of LED (either UV or blue) coated with one or more fluorescent materials, thereby making the overall construct of a white light producing LED more compact, simpler in construction, and lower in cost versus the former alternative. Furthermore, the broadband light emission provided by most fluorescent materials or phosphors allows the possibility of high color-rendering white light.

A recent breakthrough in the efficiency of UV/blue LEDs has resulted in phosphor-coated blue LEDs becoming a serious contender for replacing conventional incandescent bulbs used in the current illumination and display backlighting applications. Most of the current commercially-available devices work by converting a portion of the blue LED emission to yellow. In such a situation, some of the blue light from the LED is transmitted through the phosphor and mixed with the yellow phosphor emission, thereby resulting in a perceived white light. Many workers have delved in the field of phosphors as evidenced by the following US patents, which are expressly incorporated by reference.

U.S. Pat. No. 4,512,911 discloses a rare earth element activated complex halide phosphor represented by the formula:

$$BaF_2.aBaX_2.bMgF_2.cBeF_2.dMe^{II}F_2:eLn$$

wherein X is at least one halogen selected from the group consisting of chlorine, bromine and iodine; $Me^{II}$ is at least one divalent metal selected from the group consisting of: calcium and strontium; Ln is at least one rare earth element selected from the group consisting of: divalent europium ($Eu^{2+}$), cerium ($Ce^{3+}$) and terbium ($Tb^{3+}$), and a is in the range between 0.90 and 1.05, b is in the range of 0 to 1.2; c is in the range of between 0 and 1.2, and d is defined by the sum of c+d being in the range of between 0 and 1.2, and $BeF_2$ is present in an amount sufficient to effect a phosphor exhibiting a higher luminance than said phosphor absent $BeF_2$ when stimulated by light of a wavelength ranging from 450 to 800 nm after exposure to X-rays.

U.S. Pat. No. 4,661,419 teaches a cerium activated rare earth halophosphate phosphor having the formula:

$$LnPO_4.aLnX_3:xCe^{3+}$$

in which Ln is at least one rare earth element selected from the group consisting of Y, La, Gd and Lu; X is at least one halogen selected from the group consisting of F, Cl, Br and I; and a and x are numbers satisfying the conditions of 0.1<a<10.0 and 0<x<0.2, respectively and exhibiting a higher stimulated emission upon excitation with a He-Ne laser of a wavelength 632.8 nm after exposure to X-rays at 80 KVp, than the phosphor wherein a is less than 0.1.

U.S. Pat. No. 5,140,604 provides mixed single-phase strontium and lanthanide oxide with a magnetolead type crystalline structure having the formula (I):

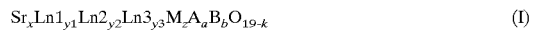
$$Sr_xLn1_{y1}Ln2_{y2}Ln3_{y3}M_zA_aB_bO_{19-k} \quad (I)$$

in which Ln1 represents at least one trivalent element selected from lanthanum, gadolinium and yttrium; Ln2 represents at least one trivalent element selected from neodymium, praseodymium, erbium, holmium and thulium; Ln3 represents an element selected from bivalent europium or trivalent cerium with retention of electric neutrality by virtue of oxygen holes; M represents at least one bivalent metal selected from magnesium, manganese, and zinc; A represents at least one trivalent metal selected from aluminium and gallium; B represents at least one trivalent transition metal selected from chromium and titanium; x, y1, y2, y3, z, a, b and k represent numbers so that 0<x<1, 0<y1<1, 0<y2<1, 0<y3<1, 0<z<1, 10.5<a<12, 0<b<0.5 and 0<k<1 provided that 0<x+y1+y2+y3<1 and that 11<z+a+b<12.

U.S. Pat. No. 5,198,679 teaches a divalent europium activated alkaline earth metal halide phosphor having the formula:

$$M''X_2 \cdot aM''X'_2 \cdot bSiO:xEu^{2+}$$

in which $M''$ is at least one alkaline earth metal selected from the group consisting of Ba, Sr and Ca; each of X and X' is at least one halogen selected from the group consisting of Cl, Br and I, and X is not the same as X'; a and x are numbers satisfying the conditions of $0.1 < a < 10.0$ and $0 < x < 0.2$, respectively; and b is a number satisfying the condition of $0 < b < 3 \times 10^{-2}$.

U.S. Pat. No. 5,602,445 teaches a bright, short wavelength blue-violet phosphor for electro luminescent displays comprising an alkaline-based halide as a host material and a rare earth as a dopant. The host alkaline chloride can be chosen from the group II alkaline elements, particularly $SrCl_2$ or $CaCl_2$, which, with a europium or cerium rare earth dopant, electroluminesces at a peak wavelength of 404 and 367 nanometers respectively. The resulting emissions have CIE chromaticity coordinates which lie at the boundary of the visible range for the human eye thereby allowing a greater range of colors for full color flat panel electroluminescent displays.

U.S. Pat. No. 5,648,181 describes an inorganic thin film electroluminescent device, comprising an inorganic light emission layer, a pair of electrodes and a pair of insulating layers, at least one of the electrodes being optically transparent, the light emission layer being positioned between the pair of insulating layers, each insulating layer being formed on an opposite side of the light emission layer, the pair of insulating layers being positioned between a light emission layer and the pair of electrodes, the light emission layer consisting essentially of inorganic material comprising a matrix of lanthanum fluoride doped with at least one member selected from the group consisting of: rare earth element metals and compounds thereof.

U.S. Pat. No. 5,698,857 teaches a radiographic phosphor screen comprising a support and, coated on the support, at least one layer forming a luminescent portion and an overcoat layer, the luminescent portion and overcoat layer including a binder that is transparent to X-radiation and emitted light and said luminescent portion including phosphor particles in a weight ratio of phosphor particles to binder of 7:1 to 25:1. The phosphor comprises oxygen and a combination of species characterized by the relationship:

$$(Ba_{1-q}M_q)(Hf_{1-z-e}Zr_zMg_e):yT$$

wherein M is selected from the group consisting of Ca and Sr and combinations thereof; T is Cu; q is from 0 to 0.15; z is from 0 to 1; e is from 0 to 0.10; z+e is from 0 to 1; and y is from $1 \times 10^{-6}$ to 0.02.

U.S. Pat. No. 5,998,925 provides a light-emitting device, comprising a light emitting component and a phosphor capable of absorbing a part of light emitted by the light emitting component and emitting light of wavelength different from that of the absorbed light; wherein the light-emitting component comprises a nitride compound semiconductor represented by the formula: $In_iGa_jAl_kN$ where $0 < i$, $0 < j$, $0 < k$ and $i+j+k=1$ and the phosphor contains a garnet fluorescent material comprising: 1) at least one element selected from the group consisting of Y, Lu, Se, La, Gd and Sm; and 2) at least one element selected from the group consisting of Al, Ga and In, and being activated with cerium. One inorganic phosphor used in commercial white LEDs is the cerium-doped yttrium aluminum garnet $Y_3Al_5O_{12}:Ce$ (YAG:Ce) and its derivative phosphors described in this patent, which is regarded by many in the field as being the standard inorganic phosphor used in commercial white LEDs as of this writing.

U.S. Pat. No. 6,066,861 teaches a wavelength-converting casting composition, for converting a wavelength of ultraviolet, blue or green light emitted by an electroluminescent component, comprising: a) a transparent epoxy casting resin; b) an inorganic luminous substance pigment powder dispersed in the transparent epoxy resin, the pigment powder comprising luminous substance pigments from a phosphorus group having the general formula:

$$A_3B_5X_{12}:M,$$

where A is an element selected from the group consisting of Y, Ca, Sr; B is an element selected from the group consisting of Al, Ga, Si; X is an element selected from the group consisting of O and S; and M is an element selected from the group consisting of Ce and Tb. The luminous substance pigments have grain sizes $<20 \mu m$ and a mean grain diameter $d_{50} < 5 \mu m$.

U.S. Pat. No. 6,153,971 describes a method for illuminating an object that allows categorical color perception of at least red, green, blue, yellow and white on the surface of the illuminated object, the method comprising: illuminating the object with light consisting essentially of the combination of light of two major wavelength bands, in which: the first wavelength band is from 530 to 580 nm; and the second wavelength band is from 600 to 650 nm.

U.S. Pat. No. 6,255,670 teaches a composition of matter comprising $Ba_2(Mg,Zn)Si_2O_7:Eu^{2+}$, as well as a composition of matter comprising: $(Ba_{1-X-Y-Z},Ca_X,Sr_Y,Eu_Z)_2(Mg_{1-w},Zn_w)Si_2O_7$, wherein $X+Y+Z1$; $Z>0$; and $0.05<W<0.50$.

SUMMARY OF THE INVENTION

The present invention provides a silicate-based fluorescent material which is capable of absorbing with high efficiency either blue, violet, or ultraviolet (UV) light emitted by an LED, and emitting light of a wavelength longer from that absorbed from the LED. The silicate phosphor materials provided by the present invention (in contrast to the green-emitting UV-pumped silicate-based materials described in U.S. Pat. No. 6,255,670), do not require the addition of dissimilar blue and red phosphor compounds, and do not contain zinc and/or magnesium. In addition, the materials of the present invention can be manufactured to emit a broad yellowish color containing both green and red emissions. By combining the materials of the present invention with a blue or violet LED, it is also possible to produce white light using a single component phosphor without the need of a complex red, green, and blue (RGB) phosphor system and a UV LED as proposed by U.S. Pat. No. 6,255,670.

The phosphor component of a light-emitting device made using the phosphors provided by the present invention may be made using either a single phosphor component or a compatible mix of different phosphors derived from the above formula in order to achieve a specific, desired white color performance.

Thus, the present invention provides a composition of matter useful as a phosphor in light emitting diodes, which comprises a material described by the formula:

$$Sr_xBa_yCa_zSiO_4:Eu^{2+}$$

in which x, y, and z are each independently any value between 0 and 2. According to one form of the invention, divalent Eu, which serves as an activator, is present in any amount between 0.0001% and about 5% in mole percent based on the total molar weight of said composition. Thus, the activator, Eu, may be present in any amount between 0.0001% and 5.00% in mole percent based on the total molar weight of the composition, including every thousandth percentage therebetween. According to an alternative form of the invention, $0.5 \leq x \leq 1.5$; $0 \leq y \leq 0.5$; and $0.5 \leq z \leq 1.5$ in the above formula. According to another alternative form of the invention, $x=1$, $y=0$, and $z=1$ in the above formula. According to another alternative form of the invention, $1.5 \leq x \leq 2.5$; $0 \leq y \leq 0.5$; and $0 \leq z \leq 0.5$ in the above formula. According to another alternative form of the invention, $x=2$, $y=0$, and $z=0$ in the above formula. According to another alternative form of the invention, $1.0 \leq x \leq 2.0$; $0 \leq y \leq 1.0$; and $0 \leq z \leq 0.5$ in the above formula. According to another alternative form of the invention, $x=1.5$, $y=0.5$, and $z=0$ in the above formula.

The invention also provides a composition of matter useful as a phosphor material in light emitting diodes, which composition comprises a material described by the formula:

$$Sr_xBa_yCa_zSiO_4:Eu^{2+},B$$

in which x, y, and z are each independently any value between 0 and 2, including 0 and 2; and wherein B, which serves as a co-activator, is selected from the group consisting of: Ce, Mn, Ti, Pb, and Sn, and wherein B is present in any amount between 0.0001% and about 5% in mole percent based on the total molar weight of said composition, including every thousandth percentage therebetween. According to an alternative form of the invention, $0.5 \leq x \leq 1.5$; $0 \leq y \leq 0.5$; and $0.5 \leq z \leq 1.5$ in the above formula with the co-activator present. According to another alternative form of the invention, $x=1$, $y=0$, and $z=1$ in the above formula with the co-activator present. According to another alternative form of the invention, $1.5 \leq x \leq 2.5$; $0 \leq y \leq 0.5$; and $0 \leq z \leq 0.5$ in the above formula with the co-activator present. According to another alternative form of the invention, $x=2$, $y=0$, and $z=0$ in the above formula with the co-activator present. According to another alternative form of the invention, $1.0 \leq x \leq 2.0$; $0 \leq y \leq 1.0$; and $0 \leq z \leq 0.5$ in the above formula with the co-activator present. According to another alternative form of the invention, $x=1.5$, $y=0.5$, and $z=0$ in the above formula with the co-activator present.

The invention also provides a light emitting device comprising a light source selected from the group consisting of: light-emitting diodes and lasers, wherein the light source emits light having a wavelength of between 360 and 480 nanometers; and a phosphor described by the formula:

$$Sr_xBa_yCa_zSiO_4:Eu^{2+}$$

in which x, y, and z are each independently any value between 0 and 2, including 0 and 2, wherein the phosphor is disposed in a location at which it receives light from said light source.

The invention also provides a light emitting device in which the phosphor is that as described in the foregoing sentence, wherein the phosphor further comprises at least one additional element selected from the group consisting of: Ce, Mn, Ti, Pb, and Sn. According to one form of the invention, the additional element is present in the phosphor of such light emitting device in any amount between 0.0001% and 5.00% in mole percent based upon the total molar weight of the phosphor. The invention also provides a light emitting device which comprises a phosphor that is a mixture of two different phosphors provided by the invention, or one phosphor provided by the invention mixed with a phosphor of the prior art. In one embodiment, the phosphor mixture causes the light emitting device to emit white light. In another embodiment, a single phosphor according to the present invention causes a blue light emitting device to emit white light.

DETAILED DESCRIPTION

Figure 1:
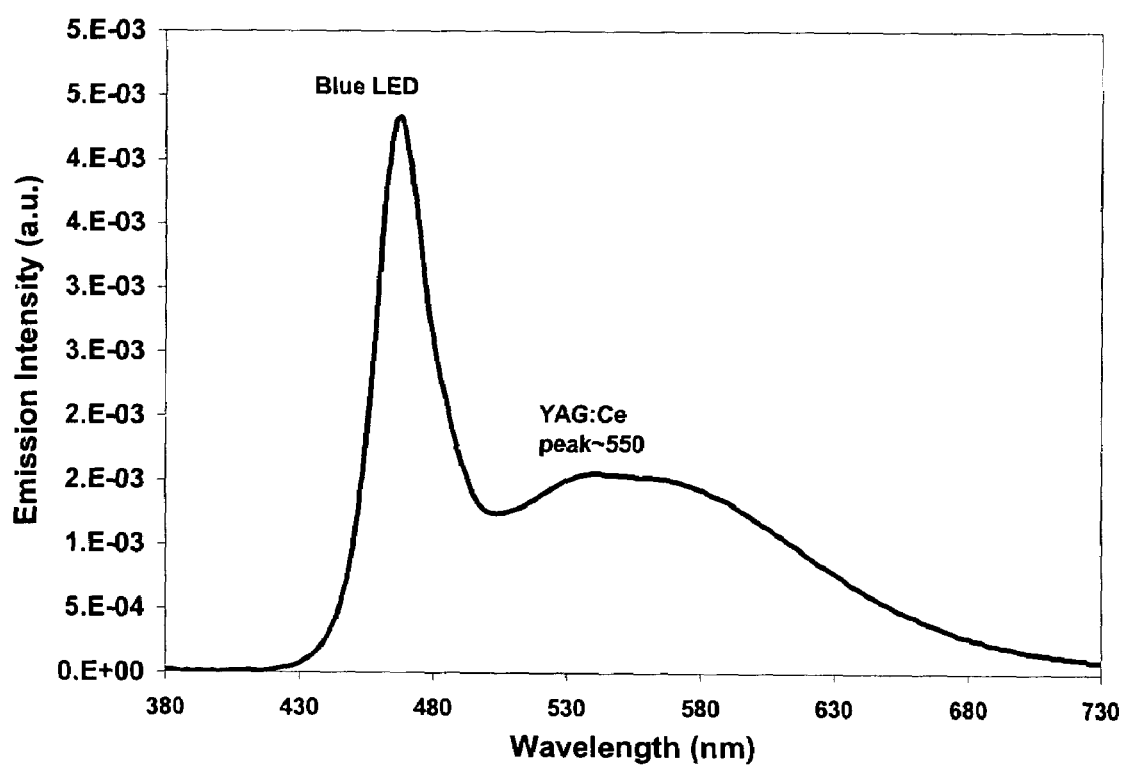
FIG. 1 shows the spectrum of light emitted by a prior art YAG:Ce phosphor in combination with a blue LED.

Referring to the drawings and initially to FIG. 1, there is shown an illustration of the spectrum of light emitted of conventional prior art YAG:Ce phosphors pumped by a blue LED to produce white light. In addition to the YAG:Ce, several types of organic-based fluorescent materials have also been employed, but organic molecules are susceptible to deterioration and accelerated aging when exposed to intense UV or blue light and the high temperatures present near the LED surface. However, with the exception of the YAG:Ce phosphor and its derivatives, there are very few inorganic materials that can efficiently convert blue or violet light to white while maintaining long-term stability. Furthermore, the standard YAG:Ce phosphor used in blue LEDs is deficient in both the blue green and red parts of the spectrum, resulting in low white luminous efficiency and color rendering properties.

One of the advantages of using a blue LED with a single-component yellow phosphor instead of a UV LED and an RGB phosphor mix is a more stable color output over time since the latter approach suffers from differential phosphor aging due to the high temperature and light intensity near the LED surface.

Figure 2:
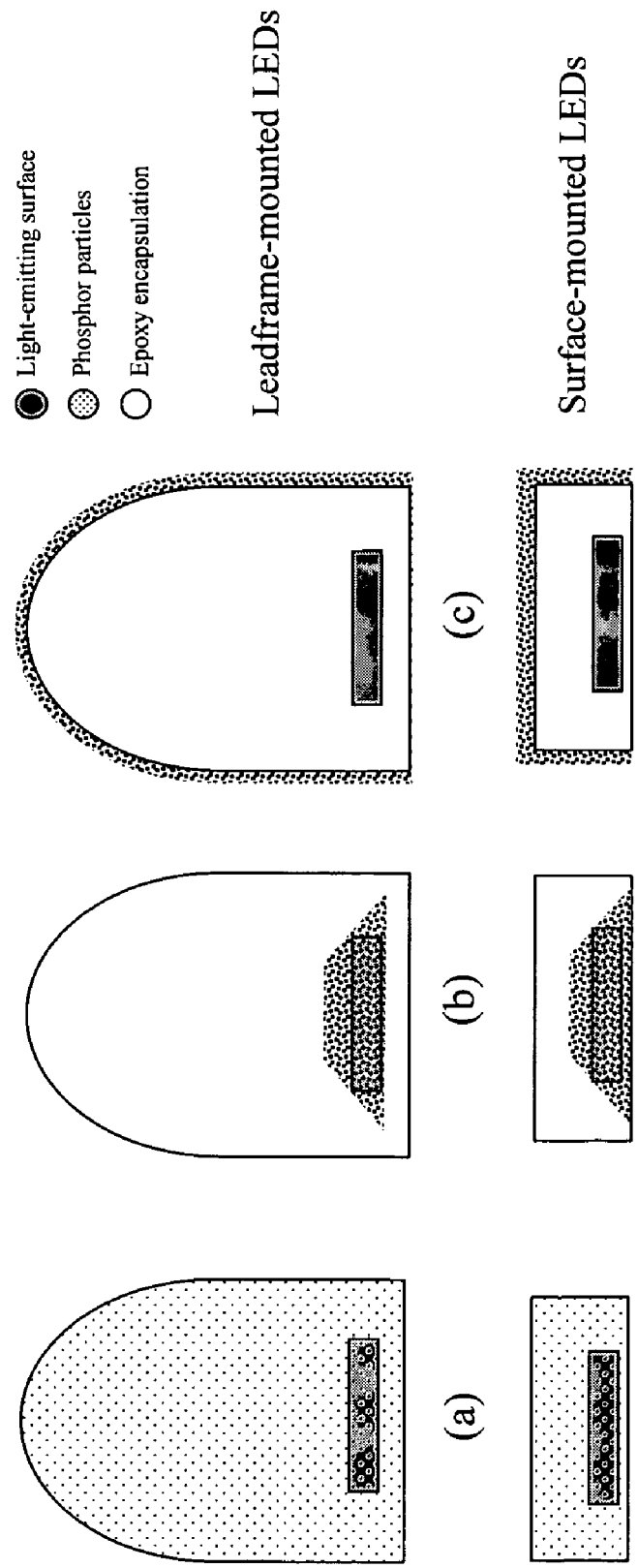
FIG. 2(a) shows a phosphor dispersed throughout epoxy according to the prior art.
FIG. 2(b) shows a phosphor dispensed directly on an LED light-emitting area according to the prior art.
FIG. 2(c) shows a phosphor disposed on the outside surface of an epoxy according to the prior art.

FIGS. 2A, 2B, and 2C illustrate some of the possible configurations used to couple the phosphor particles to an LED, where the phosphor can be either dispersed throughout the epoxy (FIG. 2A), or dispensed directly on the LED light emitting area (FIG. 2B), or on the outside surface of the epoxy (FIG. 2C). The epoxy may encapsulate the LED. The standard commercial technique used in phosphor deposition on LED dies involves blending the phosphor powders in optically clear liquid polymer systems, such as polypropylene, polycarbonate, or polytetrafluoroethylene (PTFE), or, more commonly, epoxy resin or silicone, as is known to those skilled in the art. The resulting material is subsequently painted or otherwise dispensed on the LED and dried, solidified, or cured. A final layer of epoxy is often subsequently applied to protect the entire assembly or to in some cases act as an optical lens for the purpose of focusing the light emitted from the LED die. Thus, the phosphors provided by the invention are well-suited to being processed and deposited onto substrates using conventional techniques known in the art for producing light emitting devices, such as light emitting diodes.

One embodiment of the present invention provides a light emitting device comprising a UV/blue light emitting diode and one or more phosphors which absorb all or part of the light emitted by the light emitting diode, and which emit light of wavelengths longer from that of the absorbed light. A phosphor provided by the invention which is useful in such regard is described by the formula:

$$Sr_xBa_yCa_zSiO_4:Eu$$

in which x, y, and z are each independently variable to be any value between about 0 and about 2, including without limitation 0.001 and 2, and every thousandth therebetween, subject to the proviso that the sum of x, y, or z is equal to at least 1, and in which Eu is present in any amount between about 0.0001% and about 5% by weight based upon the phosphor's total weight. According to a preferred form of the invention, at least 50% of all of the europium present is present in the divalent state. According to another preferred form of the invention, at least 70% of all of the europium present is present in the divalent state. According to another preferred form of the invention, at least 90% of all of the europium present is present in the divalent state. According to another preferred form of the invention, at least 95% of all of the europium present is present in the divalent state. According to another preferred form of the invention, at least 98% of all of the europium present is present in the divalent state. It is most preferred that all of the europium present is present in the divalent state.

In yet another preferred form of the invention is provided a phosphor as described by the formula $$Sr_xBa_yCa_zSiO_4:Eu$$

wherein the values for x, y, and z are all independently variable as previously set forth above, and in which the oxidation state of europium is as specified above, which phosphor further comprises an optional element selected from the group consisting of Ce, Mn, Ti, Pb, and Sn and which optional element is present in any amount between about 0.0001% and about 5% by weight based on the phosphor's total weight.

The phosphor materials provided by the present invention are preferably synthesized using alkaline earth carbonates and silica as the starting materials. After mixing of the raw materials in the desired molar ratio, a compound (e.g., an oxide or a carbonate) containing an activating element, or "activator", is slurried into the raw material mixture. Activating elements are well known in the art and include such elements as europium, cerium, copper and manganese. Additionally, it is preferred to add one or more halide flux materials ($NH_4Cl$, $SrCl2$, etc.) to enhance the reaction between the host material, which according to one preferred form of the present invention is $Sr_xCa_yBa_zSiO_4$, in which x, y, and z are each independently variable to be any value between about 0 and about 2, including without limitation 0.001 and 2, and every thousandth therebetween, and the use of such fluxes are known to those skilled in the art. After a thorough mechanical mixing using conventional means such as a mortar and pestle, ball mill, grinder, etc., the resulting material is fired at a temperature which is preferably in the range of about 1050° C. to about 1250° C. in air, to convert the carbonates present into oxides. The material resulting from such firing is subsequently cooled, and then cocomminutated before a final firing stage at a temperature in the range of about 1050° C. to about 1250° C. in a reducing atmosphere, such as in carbon monoxide or hydrogen, to obtain divalent Eu activation. Close control of the source materials and preparation procedures are required to obtain phase purity in these phosphors. The relative amounts of Ca, Ba, and Sr present in the final product are readily determined by one of ordinary skill by adjusting the relative amounts of the raw materials which contain these elements in the raw material mixture.

The manufacturing process is not limited to the one previously described, but different starting materials and synthesis techniques can be used to achieve the same results and compounds. For example, the present invention contemplates the use of peroxides, such as barium peroxide, calcium peroxide, etc. as raw materials. The following examples are illustrative of preferred raw material mixtures.

EXAMPLE 1

| | |
|---|---|
| $SrCO_3$ | 145 grams |
| $BaCO_3$ | 197 grams |
| $SiO_2$ | 63 grams |
| $Eu_2O_3$ | 3.5 grams |
| $NH_4Cl$ | 5.4 grams |

EXAMPLE 2

| | |
|---|---|
| $BaCO_3$ | 390 grams |
| $SiO_2$ | 63 grams |
| $Eu_2O_3$ | 3.5 grams |
| $NH_4Cl$ | 5.4 grams |

A phosphor according to the invention may be produced using mixtures of the ingredients specified in either of examples 1 or 2 above, by combining, slurry-mixing, and subsequently ball-milling in de-ionized water to an average particle size of about one to five microns. After drying, the mixture is fired in a quartz crucible at 1000° centigrade for 1 hour in an atmosphere of air. After firing, 5 grams of ammonium chloride is added, and the mixture is again cocomminutated using a ball mill to an average particle size of about one to five microns. The mixture is again fired, but this time in a reducing atmosphere (such as in either carbon monoxide or in hydrogen) for an additional 3 hours to yield a phosphor according to the invention.

Figure 3:
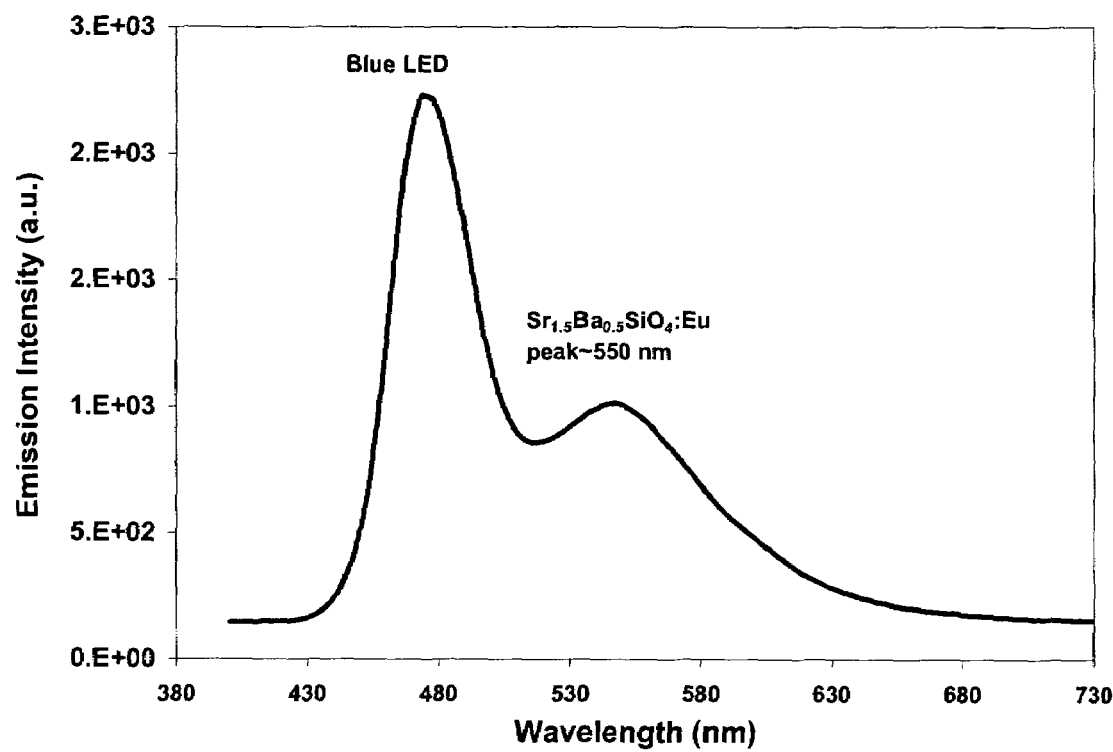
FIG. 3 illustrates the spectrum of one of the novel silicate phosphor phases pumped by a blue LED.

In one preferred embodiment of the invention for applications requiring efficient bluish white ("cool white") the present invention provides a green-yellow phosphor comprising $Sr_xBa_yCa_zSiO_4:Eu,B$ in which x=1.5; y=0.5, z=0, and optional element B is not present, yielding $Sr_{1.5}Ba_{0.5}SiO_4:Eu$ in which essentially all of the europium present is in the divalent state as a result of the effect of the final firing in the reducing atmosphere. The performance of this phosphor is shown in FIG. 3 which illustrates how one composition of the present invention can be used to efficiently convert part of the emission from a blue LED at 470 nm to yellow-green light around 550 nm, thus yielding a white light emission.

Figure 4:
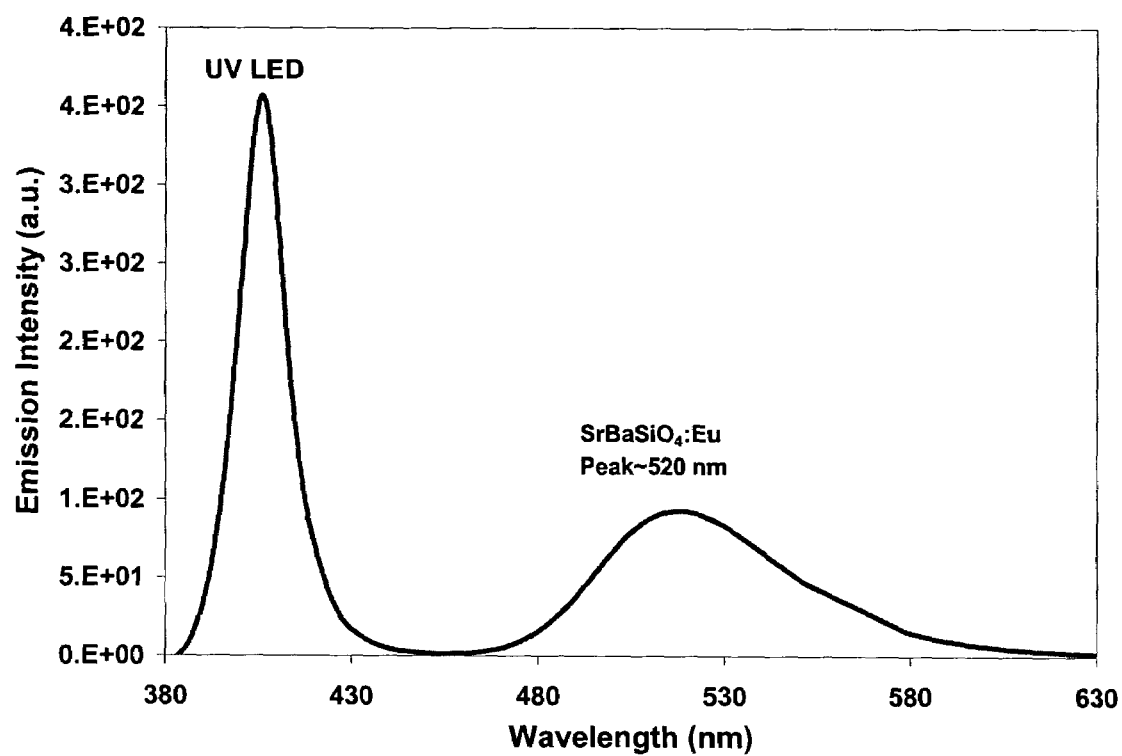
FIG. 4 illustrates the spectrum displayed by a composition of the present invention pumped by an LED operating in the UV range.

FIG. 4 illustrates the spectrum displayed by another composition of the present invention, $SrBaSiO_4:Eu$ that efficiently converts the emission from a UV LED at 405 nm to green light around 520 nm.

Figure 5:
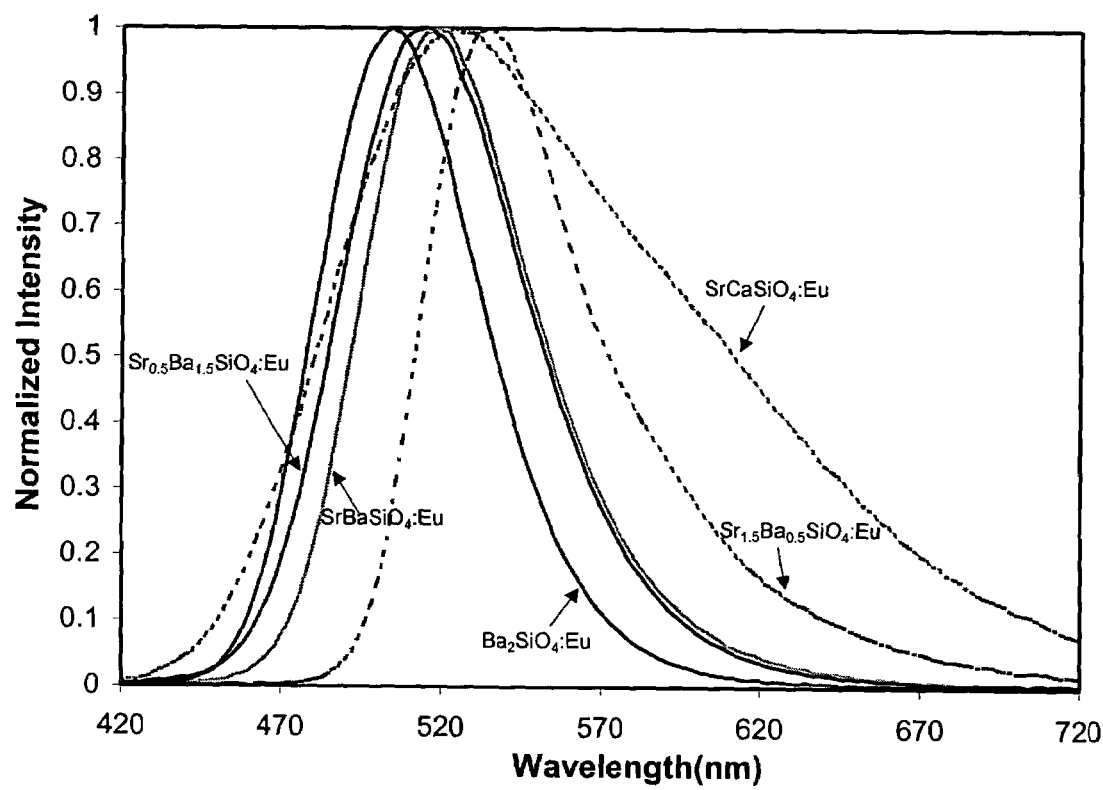
FIG. 5 illustrates the emission spectra of several different compositions of the present invention.

In another preferred embodiment, for applications requiring higher red content ("warm white"), the present invention provides a yellow phosphor based on $Sr_xBa_yCa_zSiO_4$:Eu,B in which x=1; y=0 and z=1, and optional element B is not present, yielding $Sr_2SiO_4$:Eu in which essentially all of the europium present is in the divalent state as a result of the effect of the final firing in the reducing atmosphere. The performance of this phosphor is shown in FIG. 5.

In another preferred embodiment, for applications also requiring higher red content ("Warm White"), the present invention provides a yellow phosphor based on $Sr_xBa_yCa_zSiO_4$:Eu,B in which x=2; y=0 and z=0, and optional element B is not present, yielding $Sr_2SiO_4$:Eu in which essentially all of the europium present is in the divalent state as a result of the effect of the final firing in the reducing atmosphere. The performance of this phosphor is also shown in FIG. 5.

Thus, there is no single preferred embodiment of the present invention; rather, the preferred composition depends upon the needs and desires of one utilizing the compositions embraced by the present invention, and the particular requirements of their needs at hand. As can be seen in FIG. 5, as the strontium content in $Sr_xBa_yCa_zSiO_4$:Eu (in which essentially all of the europium present is in the divalent state as a result of the effect of the final firing in the reducing atmosphere) is increased (e.g., for higher x values and lower y and z values), the emission from the phosphor shifts from bluish green to yellow. Also, the absorption peak of the phosphor shifts from the ultraviolet to the blue region. Hence, the present invention is versatile in the number of phosphors possible within its scope. Thus, FIG. 5 illustrates the emission spectra of several different possible compositions of the present invention, according to the formula $Sr_xA_ySiO_4$:$Eu^{2+}$,B and which shows the degree of wavelength tunability possible.

Consideration must be given to the fact that although this invention has been described and disclosed in relation to certain preferred embodiments, obvious equivalent modifications and alterations thereof (either in view of this specification and its appended claims alone or by combination therewith with one or more teachings of the prior art), will undoubtedly become apparent to one of ordinary skill in this art upon reading and understanding this specification and the claims appended hereto. Accordingly, the presently disclosed invention is intended to cover all such modifications and alterations, and is limited only by the scope of the claims that follow.

What is claimed is:

1. A composition of matter useful as a phosphor material in light emitting diodes, which composition comprises a material described by the formula:

$$Sr_xBa_yCa_zSiO_4:Eu,B$$

in which x, y, and z are each independently any value between 0 and 2, including 0 and 2 and subject to the proviso that the sum of x, y, or z is equal to at least 1; and wherein B is selected from the group consisting of: Ce, Mn, Ti, Pb, and Sn, and wherein at least 50% of all of the europium present is in the divalent state.

2. A composition according to claim 1 wherein $0.5 \leq x \leq 1.5$; $0 \leq y \leq 0.5$; and $0.5 \leq z \leq 1.5$.

3. A composition according to claim 1 wherein x=1, y=0, and z=1.

4. A composition according to claim 1 wherein $1.5 \leq x \leq 2.5$; $0 \leq y \leq 0.5$; and $0 \leq z \leq 0.5$.

5. A composition according to claim 1 wherein x=2, y=0, and z=0.

6. A composition according to claim 1 wherein $1.0 \leq x \leq 2.0$; $0 \leq y \leq 1.0$; and $0 \leq z \leq 0.5$.

7. A composition according to claim 1 wherein x=1.5, y=0.5, and z=0.

8. A composition according to claim 2 wherein B is present in any amount between about 0.0001% and about 5% in mole percent based on the total molar weight of said composition.

9. A composition according to claim 3 wherein B is present in any amount between about 0.0001% and about 5% in mole percent based on the total molar weight of said composition.

10. A light emitting device comprising:
   a) a light source selected from the group consisting of: light-emitting diodes, lamps, and lasers, wherein said light source emits light having a frequency of between about 360 and about 480 nanometers; and
   b) a mixture of at least two different phosphors described by the formula:

$$Sr_xBa_yCa_zSiO_4:Eu$$

in which x, y, and z are each independently any value between 0 and 2, including 0 and 2 subject to the proviso that the sum of x, y, or z is equal to at least 1, and wherein at least 50% of all of the europium present is present in the divalent state, wherein said mixture of phosphors is disposed in a location at which it receives light from said light source.

11. A light emitting device according to claim 10, wherein said mixture of at least two different phosphors emit white light.

12. A light emitting device comprising:
   a) a light source selected from the group consisting of: light-emitting diodes, lamps, and lasers, wherein said light source emits light having a frequency of between about 360 and about 480 nanometers; and
   b) a phosphor described by the formula:

$$Sr_xBa_yCa_zSiO_4:Eu$$

in which x, y, and z are each independently any value between 0 and 2, including 0 and 2 subject to the proviso that the sum of x, y, or z is equal to at least 1, and wherein at least 50% of all of the europium present is present in the divalent state, and further comprising:
   c) a phosphor described by the formula:

$$Sr_xBa_yCa_zSiO_4:Eu^{2+}, B$$

in which x, y, and z are each independently any value between 0 and 2, including 0 and 2 subject to the proviso that the sum of x, y, or z is equal to at least 1, and further comprising at least one additional element B selected from the group consisting of: Ce, Mn, Ti, Pb, and Sn, wherein said additional element B is present in any amount between about 0.0001% and about 5% in mole percent based upon the total molar weight of said phosphor, and wherein at least 50% of all of the europium present is present in the divalent state, thus providing a mixture of phosphors, wherein said mixture of phosphors is disposed in a location at which it receives light from said light source.

13. A device according to claim 12, wherein said mixture of phosphors emit white light.

* * * * *